Patented Apr. 15, 1941

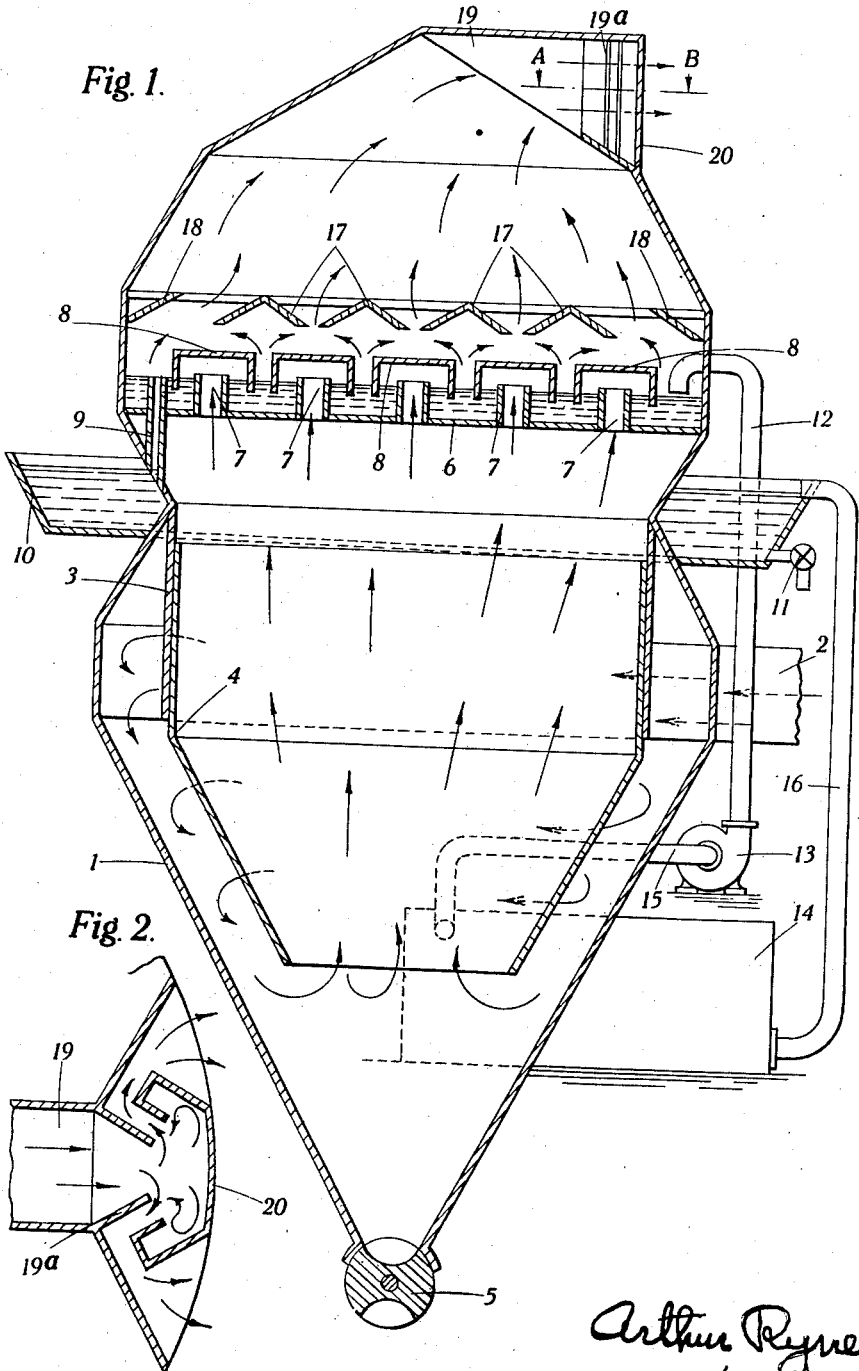

2,238,824

UNITED STATES PATENT OFFICE 2,238,824

SEPARATION OF FINE PARTICLES FROM GASES

Arthur Ryner, London, England, assignor to Traughber Engineering Company, Cleveland, Ohio, a corporation of Ohio Application November 26, 1938, Serial No. 242,584
In Great Britain November 26, 1937

1 Claim. (Cl. 183—21)

This invention relates to the separation of fine particles from gases and is concerned with an improved method of and apparatus for use in removing dust and fume from gases of the kind in which a washing liquid, such as water, with a wetting agent, which may be an oil carried on the surface of the liquid, is caused to contact with the dust and fume and remove them from the gases.

According to the invention a method of removing dust and fume consists in causing the gases to be cleansed first to travel in a helical path such that the heavy or large particles are deposited in a dry state under the action of centrifugal force and subsequently to bubble through a washing liquid which comprises a wetting agent such as a water-immiscible oil, forms a froth on its surface and retains the light or fine particles.

Apparatus for carrying out this method comprises, in accordance with the invention, means for causing the gases to be cleansed to travel in a helical path and for collecting the heavy or large particles deposited under the action of the centrifugal forces produced, in combination with means for maintaining a layer of washing liquid surmounted by froth and means for causing the gases freed from heavy particles to bubble through the said liquid and froth.

It is preferred to employ for the wet-separation stage an apparatus substantially identical with that described in the specification of United States application Serial No. 49,849 filed November 14, 1935, and, as described in the said specification, to add to the washing liquid a wetting agent in the form of a water-immiscible oil of lower specific gravity than water.

The invention will be described, by way of example, with reference to the accompanying drawing which illustrates an apparatus in accordance therewith comprising wet-separation apparatus according to the prior specification referred to. In the drawing—

Fig. 1 is a somewhat diagrammatic sectional elevation of the complete apparatus, and Fig. 2 is a detail in section on the line A—B of Fig. 1.

As shown the apparatus comprises an outer casing formed at the lower part to a downwardly tapering conical hopper 1. The gases to be cleansed are introduced into the upper and wider end of the hopper 1 by way of an inlet 2 which delivers them into the interior of the hopper in a tangential direction. Depending from the upper edge of an inwardly tapering upward extension of the hopper is a cylindrical skirt 3 within which is vertically adjustable a hollow member 4 having open upper and lower ends and formed over the lower part of its length to a conical shape such that its external wall is located substantially parallel with the internal wall of the hopper 1. At the lower end the hopper 1 is provided with an outlet controlled by any suitable form of valve for example the rotary valve 5 illustrated.

The upper part of the outer casing of the apparatus has disposed transversely thereof a plate 6 which is formed with a number of aepertures surrounded by short vertical riser pipes 7. The pipes 7 are located in rows each of which has located above it an inverted channel section member 8 suitably supported from the outer wall of the casing.

At a suitable point there is provided an overflow pipe 9 which passes through the plate 6 to open through the outer wall of the casing into the liquid-containing space of a trough 10 encircling the casing. The base of the trough has a slight fall to an outlet for sludge controlled by a valve 11.

The height of the overflow pipe 9 is such that liquid fed on to the plate 6 will be maintained at a level just beneath the upper ends of the riser pipes 7 and just above the lower edges of the depending flanges of the channel section members 8. Liquid is fed on to the plate by way of a pipe 12 supplied by a pump 13 which draws liquid from the upper part of a settling tank 14 through a pipe connection 15. The liquid which overflows through the overflow pipe 9 rises in the trough 10 until it in turn overflows therefrom through the pipe 16 which conducts it to the lower part of the settling tank 14.

Within the upper part of the casing and just above the channel section members 8 are located a series of ridged baffle members 17, preferably as shown so that the ridge of each baffle member is located vertically above the gap between a pair of adjacent channel section members. At each end there may be provided a simple inclined baffle plate 18 adapted to direct the gases rising from the layer of liquid inwardly on their way to an outlet 19 provided at the upper end of the upper part of the casing.

The outlet 19 is furnished with impingement baffle means 20 adapted to cause the separation from the gas stream of any liquid which may be carried along thereby. As can be seen from Fig. 2 the outlet 19 terminates in a nozzle like portion 19a which directs the gases against a transverse wall portion of the baffle means 20, the said portion being formed along each vertical edge with a channel section extension directed towards and substantially parallel with the outer walls of the nozzle 19a.

In the operation of the apparatus described the gases to be cleansed are supplied through the inlet 2. As will be understood they may be forced through the apparatus under pressure or alternatively may be sucked through the apparatus as, for example, by the action of chimney draught. In the latter case the gases issuing from the outlet 19, 19a would be conducted to a suitable flue or chimney. Due to the tangential disposition of the inlet 2 and the shape of the lower part of the casing 1, the stream of gases travels downwardly in a helical path until it reaches the lower edge of the member 4. Due to the circular component of the motion imparted to the gases the larger and heavier particles suspended therein are thrown outwardly under the action of centrifugal force and collect on the inner surface of the lower portion of the casing. These particles then travel downwardly under the action of gravity to collect at the outlet of from which they may be discharged at intervals by operation of the valve 5. These particles as will be understood are in the dry state.

The stream of gases passes inwardly over the lower edge of the member 4 and then upwardly through this member to pass as a number of separate streams through the riser pipes 7. The gases collect in the spaces beneath the channel section members 8 and escape therefrom around the lower edges of these members, bubbling upwardly through the layer of liquid maintained on the plate 6. During this process any light particles still contained in the gases are effectively removed therefrom and collect in the liquid. The cleansed gases pass upwardly around the baffle members 17, 18 to the outlet 19. The baffle members 17, 18 cause the deposition of a large proportion of the liquid spray which may be carried along by the gases and the last remaining traces of liquid are effectively removed due to the reversal of the direction of travel of the gases which is caused by their passage through the channels provided between the baffle means 20 and the nozzle outlet 19a. The liquid is deposited in the channels of the baffle means 20 and travels downwardly in these to be returned through apertures (not shown) into the interior of the upper part of the casing.

The dirty liquid on the plate 6 continuously overflows through the pipe 9 to the trough 10 where the solid particles commence to separate out. The sludge which collects in the trough may be removed at intervals through the valve 11. The partially clarified liquid overflows from the trough 10 to the tank 14 where the settling out of the particles is completed. Substantially clean liquid is returned by the pump 13 to the body of liquid maintained on the plate 6.

Since certain of the fine particles which it is desired to remove from the gases will pass unwetted through water, which is the preferred washing liquid, it is advantageous to supply over the surface of the washing liquid a thin layer of a water-immiscible oil acting as a wetting agent as described in the specification already referred to. This oil forms a froth with the washing liquid due to the gases bubbling therethrough and effectively wets the particles and thus ensures their retention by the froth. The dirty froth overflows through the pipe 9 and has the trapped particles removed therefrom in the manner already described before being returned to the space above the plate 6. Additional wetting agent may be supplied as desired through a branch pipe opening into, for example, the pipe 15.

It is possible by adjusting the member 4 vertically within the skirt 3 to regulate, within limits, the size of the particles which are collected in the dry state in the lower part 1 of the casing.

What I claim is:

Apparatus for removing dust and fume from gases comprising a casing having an inlet and an outlet for said gases and closed to the outside atmosphere between said inlet and outlet, said casing being formed with a cyclone separator for removing heavy or large particles, a froth floor mounted in said casing over the upper outlet end of the cyclone separator for removing the difficultly separable components and comprising a pan for mixed washing liquid and wetting agent, an overflow from the said pan, riser pipes extending through the bottom of the said pan to a level above the level of the overflow from the pan, and spaced cover members disposed over the pipes and dipping below the level of the overflow, a series of baffle members mounted in said casing one over each of the spaces between the cover members, an annular liquid-receiving trough surrounding the outlet end of the cyclone separator and having the overflow opening into it, a settling tank, a connection between the upper part of the trough and the settling tank and a pump connected between the said tank and a liquid inlet disposed close above the upper surface of the liquid in the pan.

ARTHUR RYNER.